United States Patent
Okabe et al.

(10) Patent No.: US 9,633,453 B2
(45) Date of Patent: Apr. 25, 2017

(54) IMAGE PROCESSING DEVICE, IMAGE PROCESSING METHOD, AND NON-TRANSITORY RECORDING MEDIUM

(71) Applicant: Rakuten, Inc., Tokyo (JP)

(72) Inventors: Makoto Okabe, Tokyo (JP); Rikio Onai, Tokyo (JP); Hiromi Hirano, Tokyo (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 135 days.

(21) Appl. No.: 14/641,583

(22) Filed: Mar. 9, 2015

(65) Prior Publication Data

US 2016/0071249 A1 Mar. 10, 2016

(30) Foreign Application Priority Data

Sep. 5, 2014 (JP) .................. 2014-181145

(51) Int. Cl.
G06T 11/00 (2006.01)
G06T 15/08 (2011.01)
G06T 5/00 (2006.01)

(52) U.S. Cl.
CPC .......... G06T 11/003 (2013.01); G06T 11/006 (2013.01); G06T 15/08 (2013.01); G06T 2211/408 (2013.01)

(58) Field of Classification Search
None
See application file for complete search history.

(56) References Cited

U.S. PATENT DOCUMENTS

2010/0215140 A1* 8/2010 Sauer .................. A61B 6/032
378/4

OTHER PUBLICATIONS

Ivo Ihrke et al., "Image-Based Tomographic Reconstruction of Flames", Eurographics/ACM SIGGRAPH Symposium on Computer Animation 2004, pp. 365-373.
David J. Heeger et al., "Pyramid-Based Texture Analysis/Synthesis", Proceedings of SIGGRAPH 1995, p. 229-238.
"Radon Transform", Wikipedia article, Jul. 12, 2014, http://en.wikipedia.org/wiki/Radon_transform.

* cited by examiner

Primary Examiner — Yingchun He
(74) Attorney, Agent, or Firm — Sughrue Mion, PLLC

(57) ABSTRACT

A volume of an object is constructed from images obtained by imaging the object or the like and depicting the object. The calculator 102 of the image processing device 101 calculates a statistic of each of first material images depicting an object. The initializer 104 constructs a volume of the object from multiple second material images depicting the object and multiple second imaging directions associated respectively with the multiple second material images. The estimator 103 estimates the statistic associated with an observation direction from the calculated statistics. The render 105 renders an image by observing the constructed volume in the observation direction. The corrector 106 corrects the rendered image based on the statistic estimated in association with the observation direction. The constructor 107 constructs a volume of the object from at least the observation direction and corrected image.

13 Claims, 15 Drawing Sheets

IMAGE PROCESSING DEVICE, IMAGE PROCESSING METHOD, AND NON-TRANSITORY RECORDING MEDIUM

CROSS-REFERENCE TO RELATED APPLICATION

The present application claims the benefit of Japanese Patent Application No. 2014-181145, filed on Sep. 5, 2014, the entire disclosure of which is incorporated by reference herein.

FIELD

The present application relates generally to an image processing device and image processing method constructing a volume of an object from images depicting the object in multiple imaging directions, and a non-transitory recording medium storing a program realizing the image processing device and image processing method using a computer.

BACKGROUND

In the prior art, tomography techniques reconstructing an original three-dimensional figure of an object from images of the object captured in multiple imaging directions have been proposed.

For example, in the CT (computer tomography) scan known as a medical technique, a radiation source and a detector are placed with an object in between and rotated with a fine pitch around the object to examine. The radiation source emits an X-ray. The emitted X-ray is absorbed and attenuated by the object in part while passing through the object and then reaches the detector.

The intensities of the X-ray detected in rotation directions are expressed by a large number of images captured in those directions. Those images are subject to the filtered back projection based on the Radon transform (see Non Patent Literature 1) to obtain an image of the object cut in any cross-section.

A volume presenting the profile of the object in a three-dimensional space can be reconstructed by arranging the cross-sectional images. A three-dimensional volume can be expressed by a set of voxel values as a two-dimensional image can be expressed by a set of pixel values.

As described above, the reconstruction by tomography techniques is intended to reproduce the original three-dimensional figure of an object as much as possible from images of the object captured in multiple imaging directions. The obtained volume is nothing but an estimated one.

Some tomography techniques can work with visible light, other than the X-ray. Furthermore, the radiation source can be a point source or linear source. It is also possible to eliminate the radiation source and detect light emitted by the object itself with a detector to capture an image of the object in each direction.

The CT scan reconstructs a volume of an object from images captured in a number of imaging directions that rotate about the rotation axis with a fine pitch. Another proposed technique reconstructs a volume of an object by the method of least squares from a number of images of the object captured simultaneously in a number of imaging direction (see Non Patent Literature 2). The technique disclosed in the Non Patent Literature 2 reconstructs a volume of flames from images captured in a number of directions.

As described above, the tomography is used to reconstruct a volume of an object from images of the object captured in multiple imaging directions. The tomography can be considered to be a technique to obtain a most likely (maximum likelihood) volume by minimizing the difference between:

1) images of an object captured in multiple imaging directions; and
2) images of a volume to be reconstructed and seen in the multiple imaging directions.

Additionally, as a correction scheme for making uniform the texture of an object depicted in multiple images, a technique utilizing a steerable pyramid and histogram matching has been proposed (see Non Patent Literature 3).

PRIOR ART TECHNOLOGY

Non Patent Literature

[Non Patent Literature 1] Radon transform, Wikipedia, the Free Encyclopedia, http://en.wikipedia.org/wiki/Radon-_transform, Jul. 12, 2014;

[Non Patent Literature 2] Ivo Ihrke and Marcus Magnor, Image-based Tomographic Reconstruction of Flames, Eurographics/ACM SIGGRAPH Symposium on Computer Animation 2004, pp. 365-373, 2004; and

[Non Patent Literature 3] David J. Heeger and James R. Bergen, Pyramid-Based Texture Analysis/Synthesis, Proceedings of SIGGRAPH 1995, pp. 229-238, 1995.

SUMMARY

However, when an image seen in an observation direction other than the imaging directions is created based on a volume reconstructed by the technique disclosed in the Non Patent Literature 2, the image is often unnaturally blurred or shows unnatural grids. Furthermore, the technique disclosed in the Non Patent Literature 2 has to acquire images of an object simultaneously in a number of imaging directions, which requires laborious tasks and often limits the number of cameras to set up.

Hence, there is a strong demand for a technique of constructing a volume of an object that gives the observer impression that the volume looks proper and natural even if there are a small number of images obtained by a scheme such as imaging an object with a camera and depicting the object.

The present disclosure is made to solve the above problem and an objective of the present disclosure is to provide an image processing device and image processing method suitable for constructing a natural volume based on an object even if there are a small number of images depicting the object, and non-transitory recording medium storing a program for realizing the image processing device and image processing method using a computer.

In the present disclosure, the image processing device calculates a statistic of each of first material images among multiple initial images depicting an object, constructs a volume of the object from multiple second material images and multiple second imaging directions associated respectively with the multiple second material images among the multiple initial images, estimates the statistic associated with an observation direction from the calculated statistics, renders an image by observing the constructed volume in the observation direction, corrects the rendered image based on the statistic estimated in association with the observation direction, and constructs a volume of the object from at least the observation direction and corrected image.

The image processing method of the present disclosure is realized by the image processing device of the present disclosure executing the procedures to accomplish the above functions.

As a computer executes the program of the present disclosure, the computer functions as the components of the above image processing device.

The present disclosure can provide an image processing device and image processing method suitable for constructing a natural volume based on an object even if there are a small number of images depicting the object, and non-transitory recording medium a program for realizing the image processing device and image processing method using a computer.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present disclosure will be described hereafter. The embodiments are given for the purpose of explanation and do not restrict the scope of the present disclosure. Thus, a person in the field may embrace embodiments in which some or all components in the embodiments are replaced with their equivalent counterparts, and such embodiments are included in the scope of the present disclosure.

Embodiment 1

In this embodiment, a mode in which a computer executes a program to realize the image processing device is described by way of example. The program can be recorded on a computer-readable non-transitory information recording medium such as a compact disc, flexible disc, hard disc, magneto-optical disc, digital video disc, magnetic tape, ROM (read only memory), EEPROM (electrically erasable programmable ROM), flash memory, and semiconductor memory. The information recording medium can be distributed/sold independently from the computer.

Generally, a computer reads a program recorded on a non-transitory information recording medium onto a RAM (random access memory) that is a temporary storage, and the CPU (central processing unit) executes the commands contained in the read program. However, with an architecture enabling mapping of a ROM and RAM in a single memory space for execution, the CPU directly reads and executes the commands contained in a program stored on the ROM.

Furthermore, the above program can be distributed/sold from a server device or the like to a terminal device or the like via a transitory transfer medium such as a computer communication network independently from a computer on which the program is executed.

Incidentally, the above program can be written in a programming language for electronic circuits operation level description. In such a case, various designs such as electronic circuit wiring diagrams and timing charts are created from the above program, and an electronic circuit constituting the above image processing device can be built based on the designs. For example, it is possible to configure the above image processing device on a reprogrammable hardware from the above program by FPGA (field programmable gate array) techniques or configure an application-specific electronic circuit by ASIC (application specific integrated circuit) techniques.

In other words, the components of the image processing device are configured to execute the procedures described below.

Figure 1:
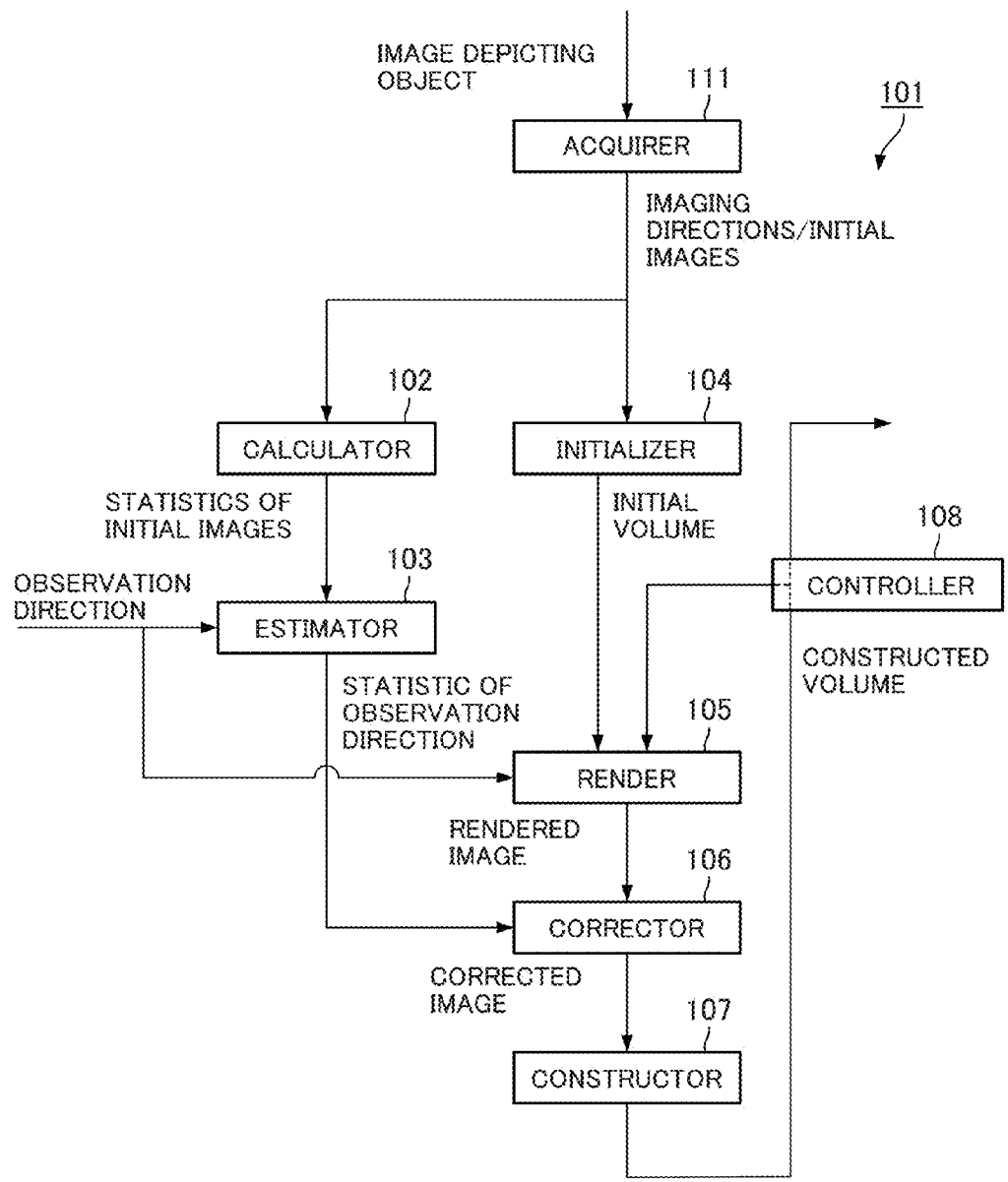
FIG. 1 is an explanatory diagram showing the general configuration of the image processing device according to an embodiment of the present disclosure.
Figure 2:
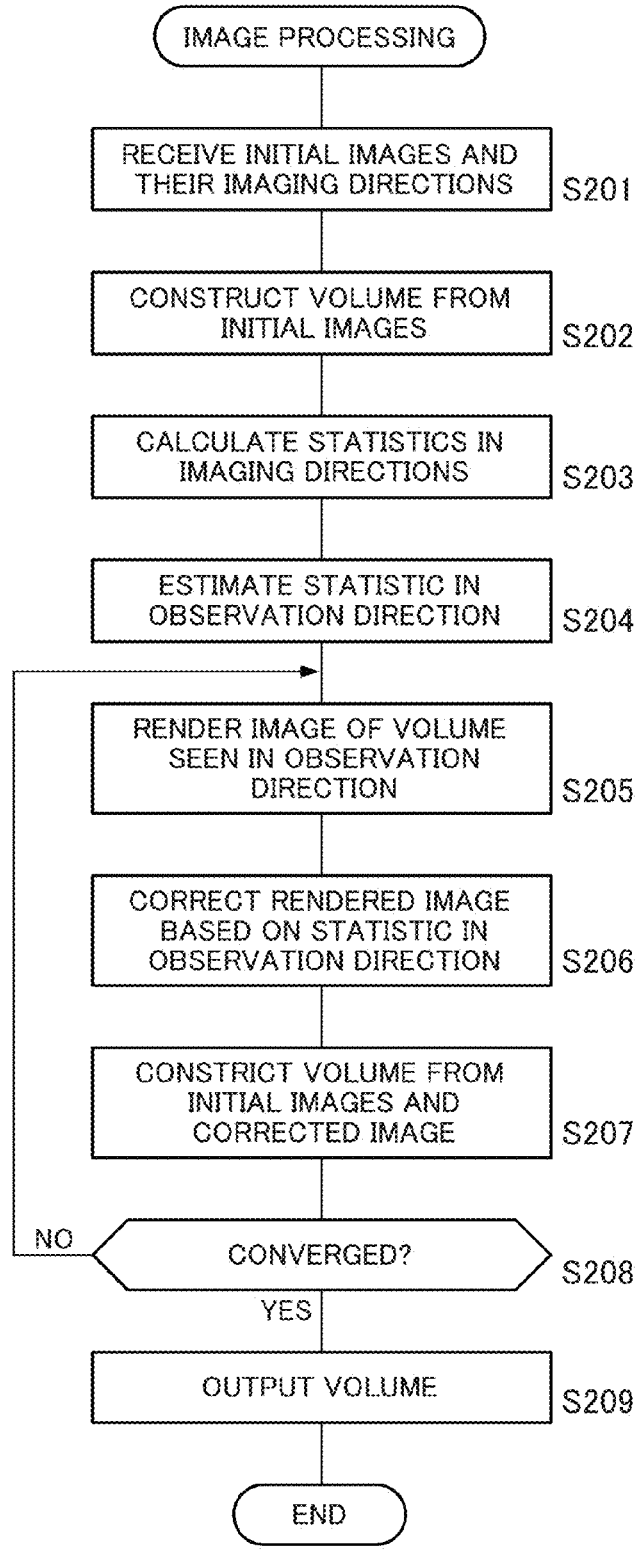
FIG. 2 is a flowchart showing the flow of control on the image processing executed by the image processing device according to the embodiment of the present disclosure.

FIG. 1 is an explanatory diagram showing the general configuration of the image processing device according to an embodiment of the present disclosure. FIG. 2 is a flowchart showing the flow of control on the image processing executed by the image processing device according to the embodiment of the present disclosure. The following explanation will be made with reference to these figures.

An image processing device 101 according to this embodiment comprises an acquirer 111, a calculator 102, an estimator 103, an initializer 104, a render 105, a corrector 106, and a constructor 107. The image processing device 101 can further comprise a controller 108 as an additional component.

First, the acquirer 111 of the image processing device 101 acquires images depicting an object as initial images associated with imaging directions (Step S201).

Here, the object can be any solid, liquid, gaseous, powder, sol, gel, or translucent object that is illuminated with parallel light such as sunlight, a point light source such as illumination, or environmental light, or that is self-luminescent.

Particularly, preferable applications include fluids such as self-luminescent flames, smoke illuminated with flames, and explosion expressed by flames and smoke. Such applications are usable for visual effect in entertainment video images. In addition, a plant with a lot of branches/leaves through which sunbeams stream can be considered to be a quasi-translucent object.

Typically, the acquirer 111 of the image processing device 101 captures multiple images, which are images of an object captured in multiple imaging directions at a certain instant. In other words, each initial image depicts the object seen in an imaging direction. Incidentally, the initial images are not restricted to captured images of a real object. Images obtained by inverting or retouching captured images of an object as appropriate or images of an imaginary thing drawn by an artist can be used.

For capturing initial images to supply to the image processing device 101, it is possible to place a number of cameras around the object or use only two cameras. FIGS. 3A to 3D are explanatory illustrations showing examples of the scheme of capturing images to supply to the image processing device 101 as input. In the following explanation, the English letters at the end of the reference numbers are omitted as appropriate to refer to the components collectively.

Figure 3A:
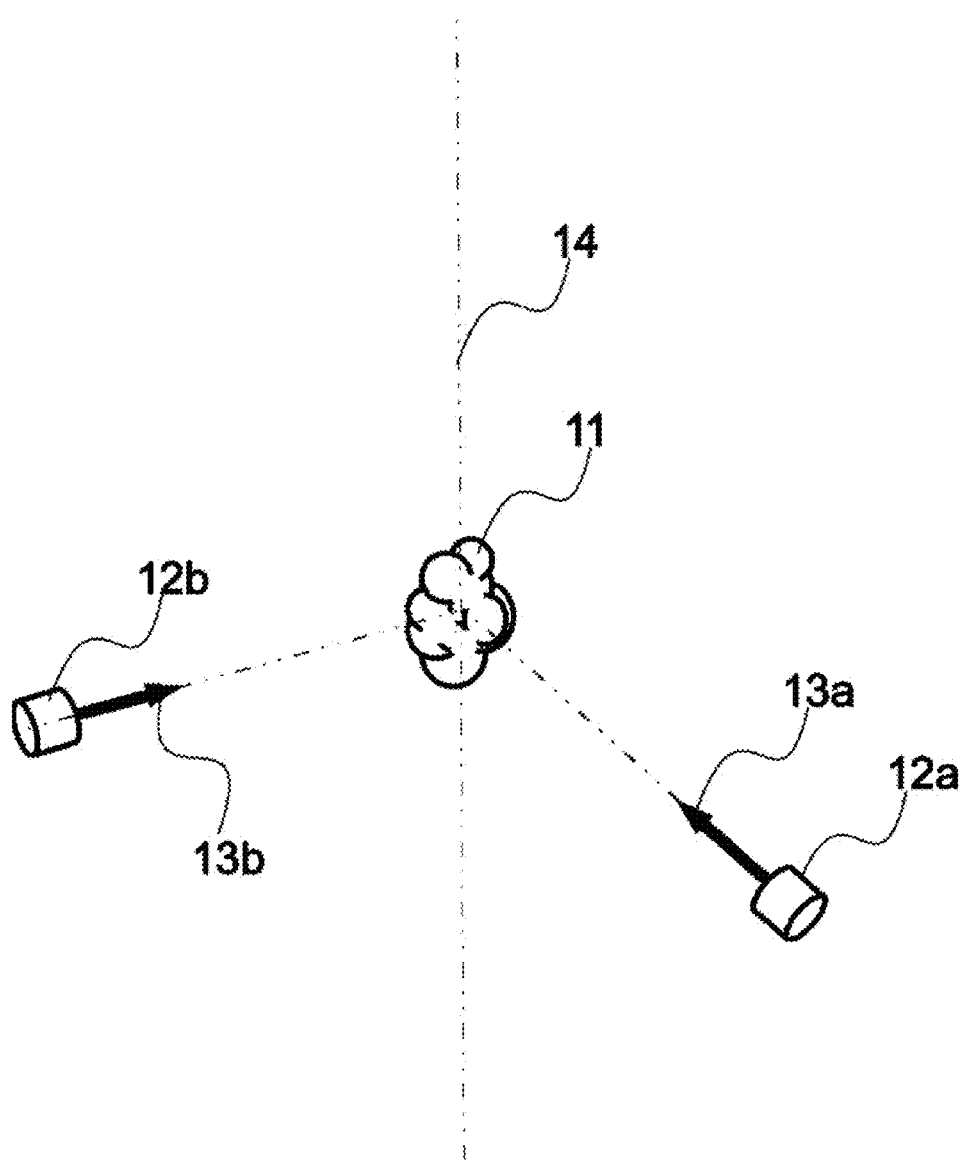
FIG. 3A is an explanatory illustration showing an example of the scheme of capturing images to supply to the image processing device as input.
Figure 3B:
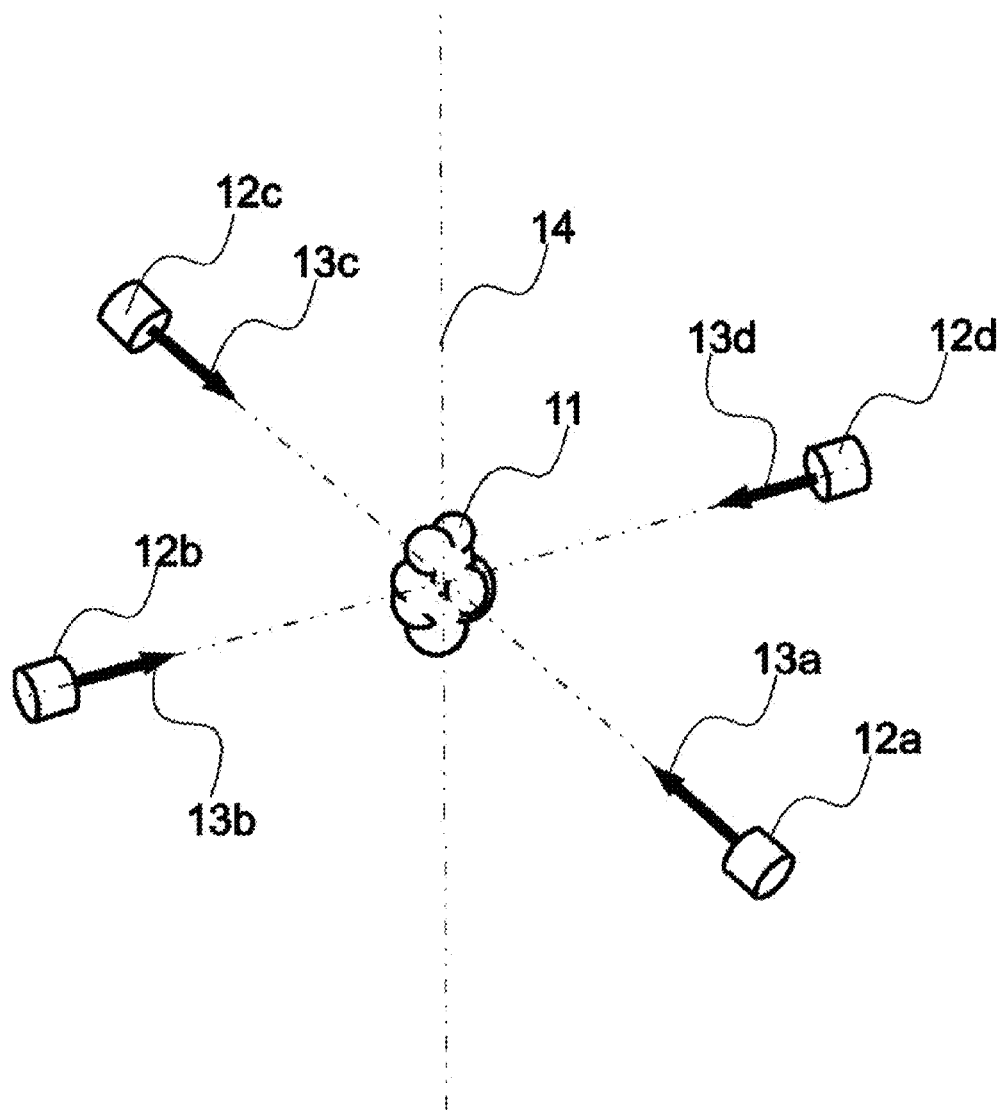
FIG. 3B is an explanatory illustration showing an example of the scheme of capturing images to supply to the image processing device as input.
Figure 3C:
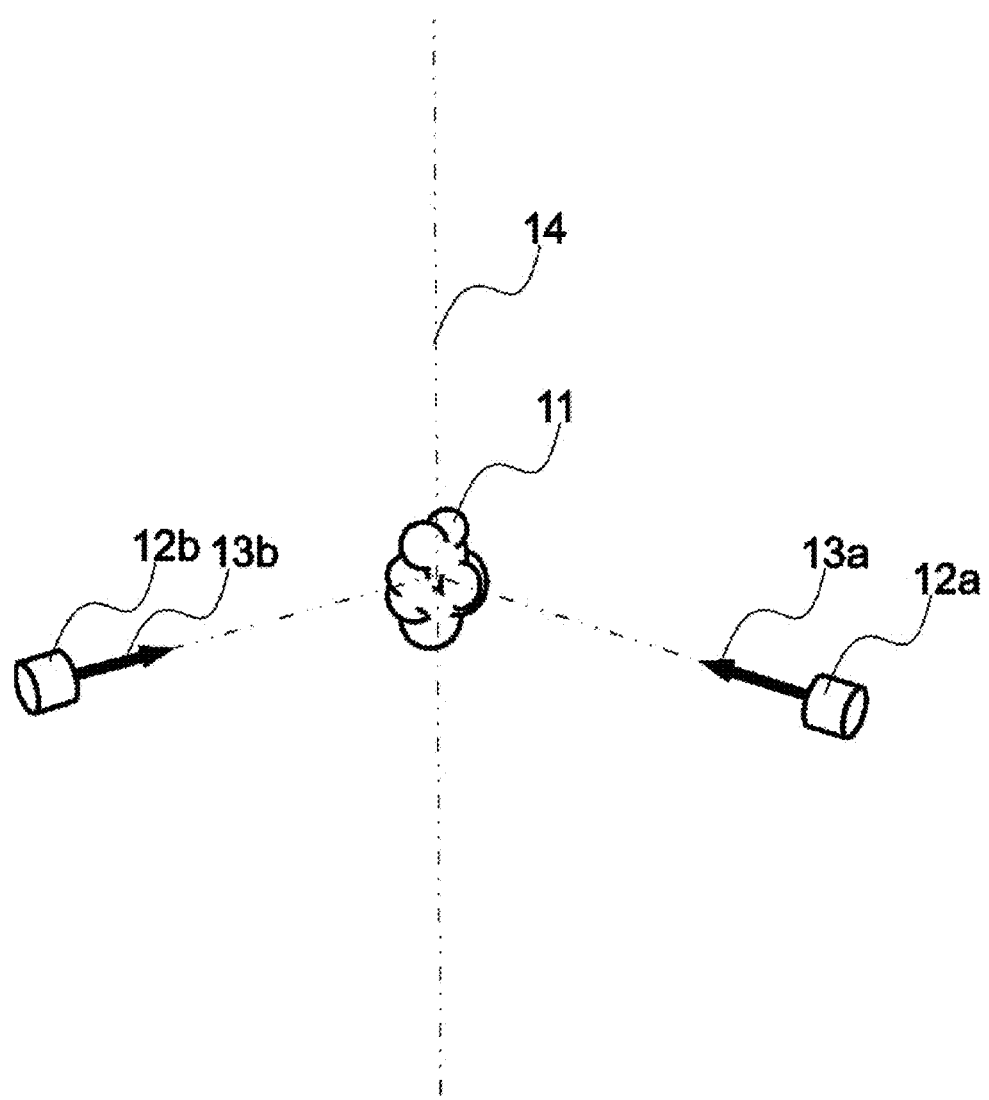
FIG. 3C is an explanatory illustration showing an example of the scheme of capturing images to supply to the image processing device as input.

The exemplary scheme of capturing images shown in FIG. 3A uses two cameras 12 to capture images of an object 11 in two imaging directions 13 nearly orthogonal to each other and obtain two still images. The two still images are supplied to the image processing device 101 as initial images. The two imaging directions 13a and 13b are orthogonal to the rotation axis 14 running through the object 11.

It is desirable that the cameras 12 are positioned at an equal distance from the object 11 in their imaging directions 13. Incidentally, this scheme utilizes various kinds of approximate calculation. In comparison between the error due to approximation and the influence of the difference in distance, the former is often greater. Therefore, if the distances between the imaging positions and the object 11 are nearly equal, a certain degree of error is acceptable. In other words, in this scheme, the position where the object 11 is situated in the camera's view field, in other words the position where the object 11 is depicted in the captured images can be determined on an arbitrary basis, whereby calibration workload is reduced.

Furthermore, the imaging directions 13 of the object 11 are not limited to two orthogonal directions. Images captured in three or more imaging directions 13 orthogonal to the rotation axis 14 running through the object 11 can be used as initial images. In the example shown in FIG. 3B, images are captured in four imaging directions 13 at 90-degree intervals around the object 11. In the example shown in FIG. 3C, images are captured in three imaging directions 13 at 120-degree intervals around the object 11. These imaging directions 13 are contained in a plane orthogonal to the rotation axis 14 and thus the imaging directions 13 are two-dimensional.

Figure 3D:
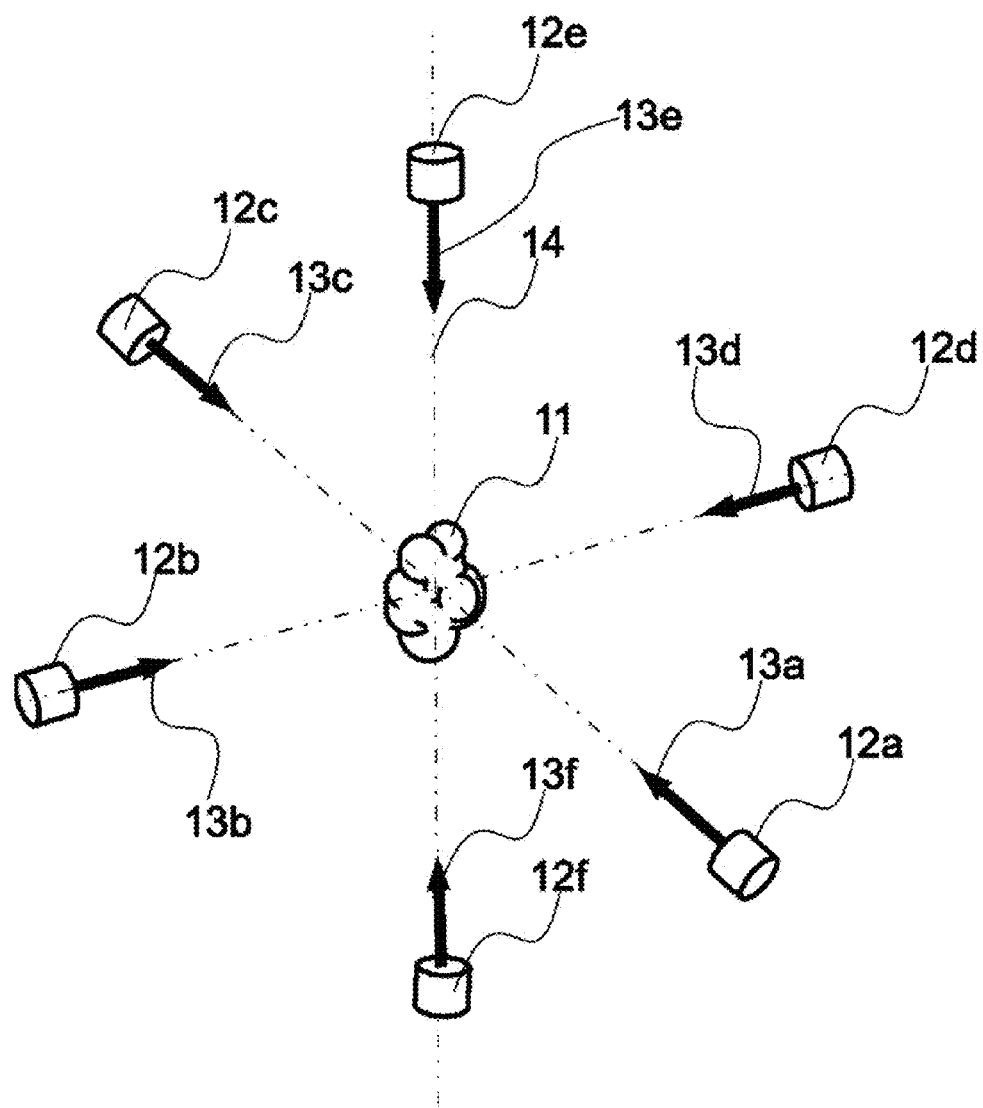
FIG. 3D is an explanatory illustration showing an example of the scheme of capturing images to supply to the image processing device as input.

In FIG. 3D, images of the object 11 are captured in six imaging directions 13, from above, below, right, left, front, and back. It is possible to select some of these directions. For example, three images captured in three imaging directions 13a, 13b, and 13e are used. This is the case in which the object 11 is positioned at the center of a regular octahedron, the cameras 12 are positioned at the vertexes, and images are captured in the centripetal imaging directions 13.

As described above, the initial images can be obtained by positioning an object at the center of a regular polyhedron or sphere and capturing images of the object in the imaging directions from the vertexes of the polyhedron or the surface of the sphere to the center.

Furthermore, if the distance between the imaging position and object varies depending on the imaging direction, the difference in distance can be compensated by enlarging or reducing the initial images so that the object is nearly of the same size in the images.

In addition, it is possible to supply to the image processing device 101 multiple video images of an object captured in multiple imaging directions. In such a case, a frame of each video image is retrieved at each imaging time and treated as a still image and the following procedure is repeated for all frames.

The following explanation will be made on the assumption that the imaging directions are two orthogonal directions and the image processing device 101 constructs a volume of an object from still images unless otherwise defined.

Figure 4:
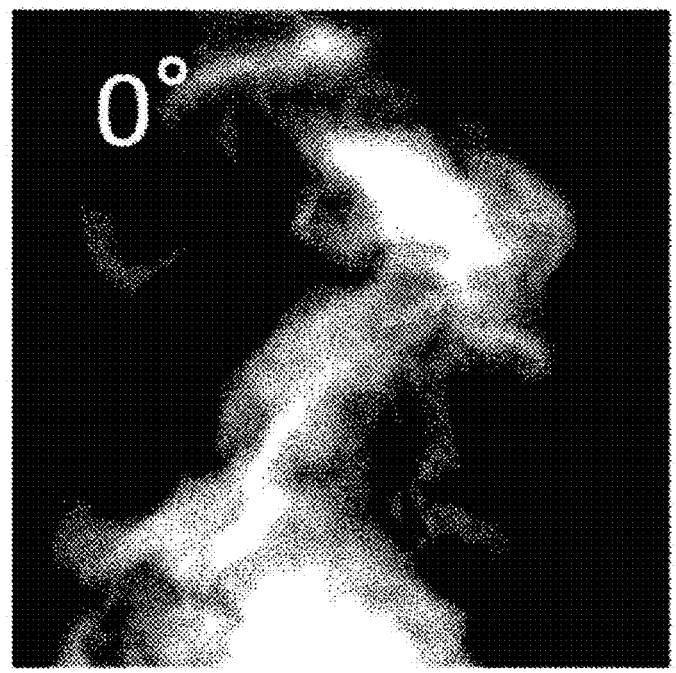
FIG. 4 is an explanatory figure presenting exemplary images of an object captured in multiple imaging directions.
Figure 4:
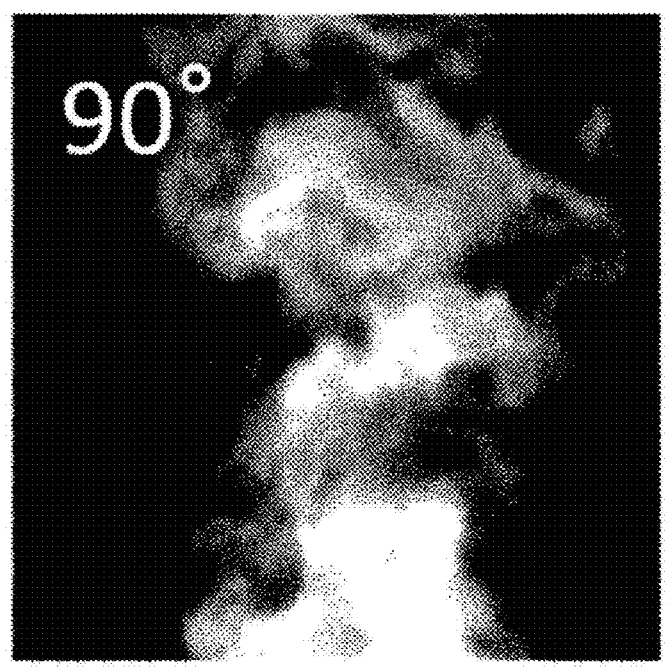

FIG. 4 is an explanatory figure presenting exemplary images of an object captured in multiple imaging directions. This figure shows the case in which a flame is used as the imaging object. In this figure, the letters "0°" and "90°" presenting the orthogonal imaging directions are displayed on the images.

Receiving multiple initial images as input, the initializer 104 of the image processing device 101 makes reference to the imaging directions associated with the initial images, respectively, and constructs an initial volume of the object (Step S202).

Any tomography technique is applicable to construct a volume of an object from multiple images of the object captured in multiple different imaging directions. Usable tomography techniques include the Radon transform and filtered backprojection disclosed in the Non Patent Literature 1 and the method of least squares disclosed in the Non Patent Literature 2, and additionally stochastic tomography and density-sheet decomposition. Any technique can be selected for use as appropriate in consideration of the number of imaging directions, the calculation workload of the image processing device, and the like.

Incidentally, in this embodiment, use of a limited small number of imaging directions for initial images is an easy and simple way to collect the materials. In such a case, it is often preferable in terms of calculation workload and the like that the initializer 104 adopts the scheme of constructing the volume from images captured in a small number of directions using the method of least squares.

The scheme using the method of least squares minimizes the difference between the captured initial images and the images to be rendered from the volume to be constructed. Therefore, the images rendered by seeing the obtained initial volume in the initial imaging directions should significantly resemble the initial images.

Ray-casting can be used to render images from a volume. The parallel projection or one-point perspective projection in the three-dimensional graphics is typically used in the ray-casting.

The parallel projection utilizes the values obtained by simply adding the voxel values of the voxels that rays perpendicular to the projection surface have encountered while passing through the initial volume or the values cumulated by attenuating addition of the voxel values in accordance with the distance between the projection surface and the voxel as the pixel values of the pixels where the rays fall on the projection surface. In the parallel projection, the size of the volume depicted on the projection surface does not depend on the distance between the projection surface and volume.

The one-point perspective projection utilizes the values obtained by simply adding the voxel values of the voxels that rays passing through a focal point positioned at a distance from the projection surface have encountered while passing through the initial volume or the values cumulated by attenuating addition of the voxel values in accordance with the distance between the focal point and the voxel as the pixel values of the pixels where the rays fall on the projection surface. With the position of the focal point being determined according to the distance between the position of the camera capturing an image of the object and the object and the focal length of the lens of the camera, the volume depicted on the projection surface can nearly be equal in size to the object of which an image is captured by the camera.

Generally, use of the parallel projection is often advantageous from the viewpoint of reducing the amount of calculation. However, where a three-dimensional graphics image processor is available, the projection scheme provided by the image processor can be used as appropriate.

When the method of least squares is used for the construction, the procedure to render images from the volume is not actually preformed; instead, a volume can be constructed by preforming some matrix calculation on the supplied images (the Non Patent Literature 2).

In other words, the following relationship is satisfied:

$$P=BV$$

in which V is a matrix of voxel values in the space where a target object is placed, B is a matrix for ray-casing projection, and P is a matrix of pixel values of an image rendered from the volume. Generally, the matrices V, B, and P are not a square matrix. In this case, the images P of an object captured in the directions of 0° and 90° and the matrix B for ray-casting in the directions of 0° and 90° are known. Therefore, $$V=(B^TB)^{-1}B^TP$$

is obtained. Then, V can be calculated by any calculation technique such as the conjugate gradient method, steepest descent method, and pseudo inverse matrix. Use of the steepest descent method or the like corresponds to minimizing the difference between the actually captured images P and the image BV rendered from the volume V to be constructed.

Figure 5:
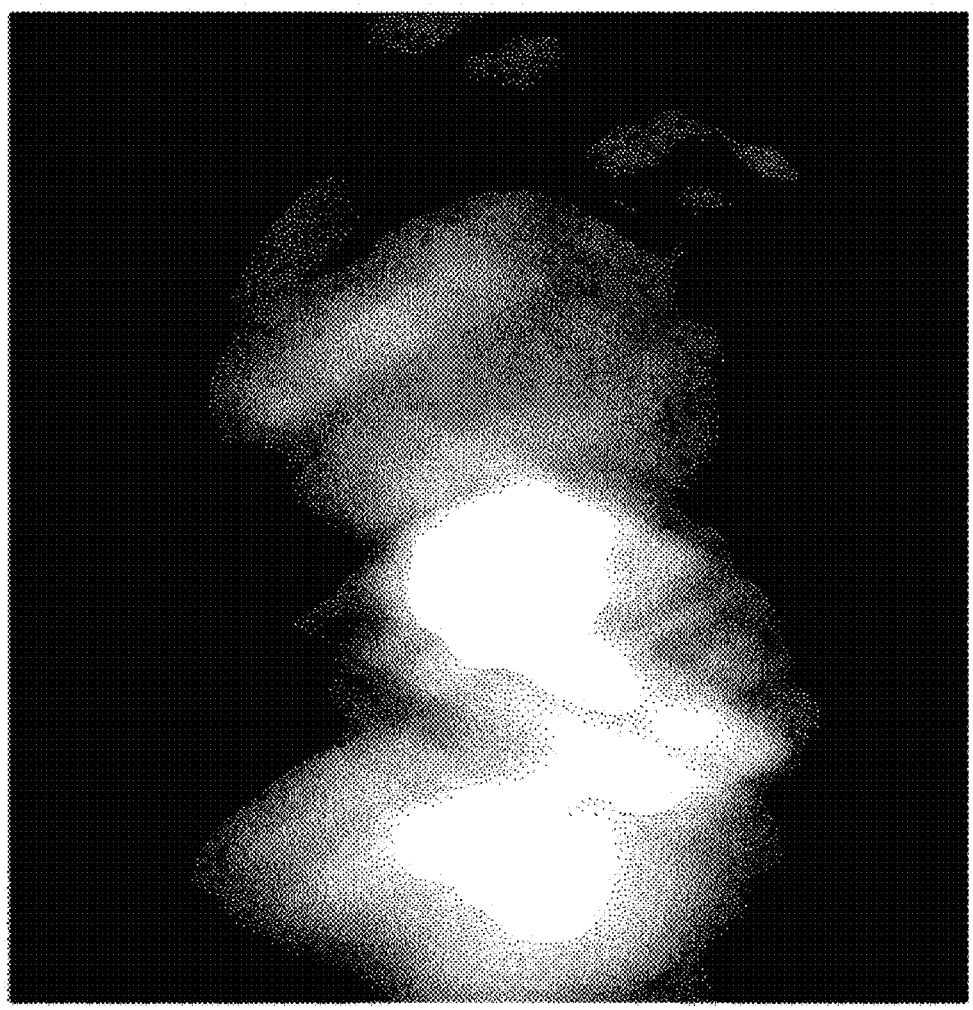
FIG. 5 is an explanatory figure presenting an exemplary image presenting the appearance of an initial volume constructed from input images and seen in an observation direction.

FIG. 5 is an explanatory figure presenting an exemplary image presenting the appearance of an initial volume constructed from input images and seen in an observation direction. This figure presents an image created by ray-casting projection to present the appearance of an initial volume constructed by the method of least squares and seen in an observation direction different from the two imaging directions (from 45 degrees diagonally above in the figure).

As presented in the figure, the initial volume exhibits rhombic grids and is blurred compared with the input images.

In this embodiment, the render 105 observes the volume constructed in the preceding step in one or more observation directions to render images (Step S205).

For example, the imaging directions of the initial images are 0° and 90°. The observation direction x is different from those directions and can be set with the pitch of 1° to 1°, 2°, 3°, . . . , 89°. The pitch, orientation, and number of observation directions x can be changed as appropriate. Incidentally, the observation directions are typically different from the imaging directions of the initial images; however, the observation directions can include the imaging directions of the initial images.

Figure 6:
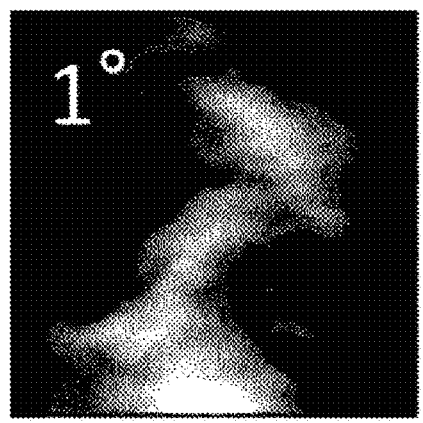
FIG. 6 is an explanatory figure presenting exemplary images rendered to present the appearance of a volume seen in multiple observation directions.
Figure 6:
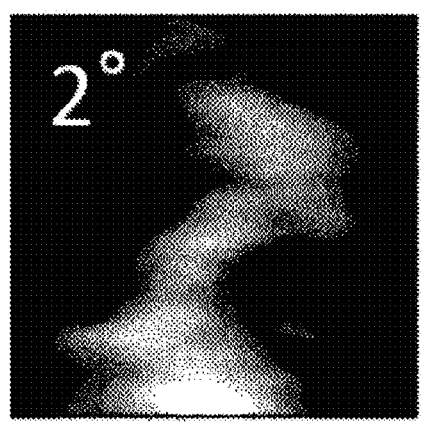
Figure 6:
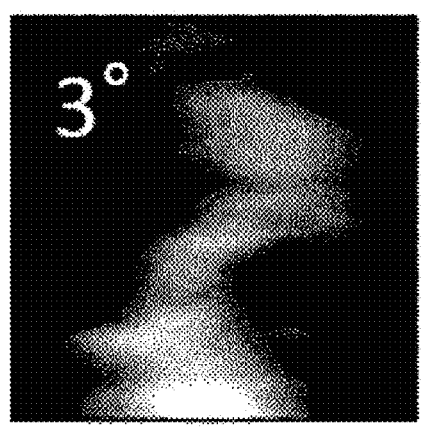

FIG. 6 is an explanatory figure presenting exemplary images rendered to present the appearance of a volume seen in multiple observation directions. This figure is created by projecting the appearance of the initial volume seen in observation directions of 1°, 2°, 3°, . . . by ray-casting. The observation directions result from rotating the imaging directions of 0° and 90° about the rotation axis running through the object. The imaging directions and observation directions are all contained in the same plane.

Also in this figure, the images are blurred compared with the input images and give different impression in its appearance from the initial images shown in FIG. 4 as in the previous figure.

The above problem occurs because the initial volume is constructed from a small number of initial images and the amount of information on initial images is smaller than the amount of information for presenting a three-dimensional structure of the object. In other words, it is significantly difficult to construct an object completely in its original form based on images captured in a small number of imaging directions.

So-called CT scan for medical purposes tries to construct a volume of an object as close to its original form as possible from a number of images. On the other hand, this embodiment aims to construct a volume that is natural to the observer as much as possible and proper for a small number of initial images. The scheme of alleviating the problem with an initial volume such as blurring due to a small amount of information will be described hereafter.

Here, the degree of blurring can be quantified by the statistics of images. A statistic v(0°) in the imaging direction of 0° and a statistic v(90°) in the imaging direction 90° can be calculated from the images shown in FIG. 4. Presumably, the images shown in FIGS. 5 and 6 are blurred to the degree that they look unnatural because the statistics of these images are deviated from the statistics v(0°) and v(90°) of the initial images. Therefore, if statistics v(1°), v(2°), . . . , v(89°) are interpolated between the initial statistics V(0°) and v(90°) and the images shown in FIG. 6 are corrected so that their statistics match the statistics v(1°), v(2°), . . . , v(89°) estimated by the interpolation, more natural images of the object observed in the observation directions 1°, 2°, . . . , 89° should be obtained. In this embodiment, such correction is performed on the images rendered with respect to multiple observation directions different from the imaging directions.

Usable statistics of the images include the following.

(1) The average brightness, luminance, chrominance, or hue of the entire image. These can be calculated from the values of the pixels contained in the image.

(2) Image contrast. In the case of a monochrome image, the image contrast can be expressed by Lmax/Lmin or (Lmax−Lmin)/Lmax in which Lmax is the maximum pixel value and Lmin is the minimum pixel value. Furthermore, the variance or standard deviation of pixel values can be used as the statistic presenting the image contrast. In the case of a color image, the variance or standard deviation of the distance between the average value of pixel values and each pixel value of the image in the RGB space can be used.

(3) Image sharpness. If an object depicted in an image has a clear contour, the image is considered to be sharp. Then, the difference between an image having the contour enhanced by filtering and the original image or the difference between an image blurred by filtering and the original image can be used as the sharpness value.

(4) Image density histogram. An image is characterized by a histogram associating each pixel value with the number of pixels having that pixel value. In the case of a color image, a histogram is prepared for each of the RGB components.

(5) Pyramid image density histogram with respect to the image texture. An image is decomposed to multiple scales and multiple passbands by the steerable pyramid method to obtain pyramid images with respect to each scale and each passband. In this mode, the density histogram of each pyramid image is treated as the statistic of the image.

Figure 7:
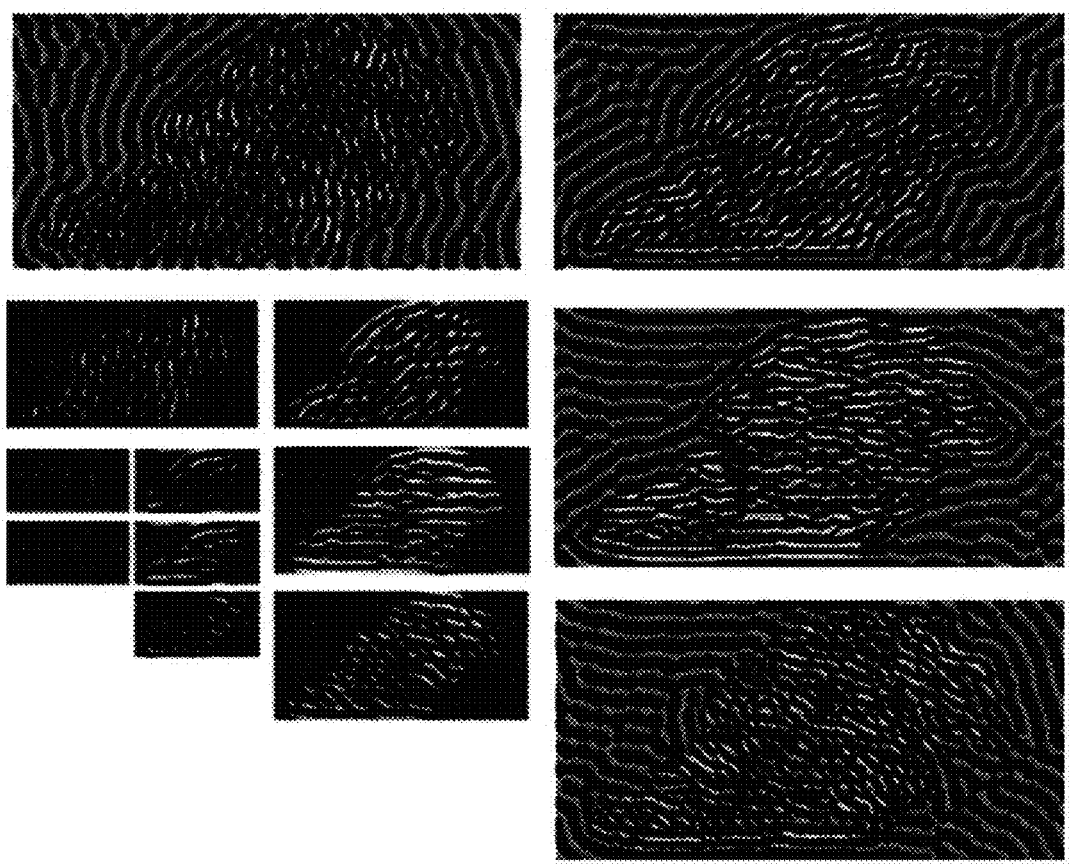
FIG. 7 is an explanatory figure presenting pyramid images obtained by decomposing an image by the steerable pyramid method.

FIG. 7 is an explanatory figure presenting pyramid images obtained by decomposing an image by the steerable pyramid method. This figure presents an image rendered by seeing a volume at a specific observation angle and decomposed to four scales and four passbands by the steerable pyramid method. This decomposition yields 14 pyramid images. In this figure, the high frequency component is not shown and 13 pyramid images are shown. In other words, in this example, the density histograms of pixel values of 14 pyramid images are treated as the statistic of the image.

Incidentally, the numbers of scales and passbands in decomposition of the steerable pyramid method can be changed as appropriate according to the application and/or computer capability.

Any one or any combination of the above statistics can be selected as the statistic used in this embodiment. For example, it is possible to treat multiple statistics collectively, for example match the steerable pyramid statistic and then finally match the density or sharpness statistic, and then interpolate the statistics in the observation directions. Furthermore, in this embodiment, the calculation is repeated: therefore, different kinds of statistics can be used in different repetition rounds. For example, the steerable pyramid statistic is matched in first several repetition rounds and the density or sharpness statistic is matched in the last repetition round or the like.

Incidentally, the scheme (5) using the density histograms of pyramid images contained in a steerable pyramid requires high computation workload, but is considered to include the other schemes (1) to (4). Thus, it is possible to utilize only the scheme (5), or utilize the schemes (1) to (4) in earlier repetition rounds where rough approximation is sufficient and utilize the scheme (5) in somewhat later repletion rounds for more precise approximation so as to reduce the overall calculation workload.

The calculator 102 calculates the statistics of the initial images in association with multiple imaging directions, respectively (Step S203). Consequently, a statistic $v(0°)$ of the image captured in one direction (0°) and a statistic $v(90°)$ of the image captured in the direction orthogonal thereto (90°) are calculated.

Then, the estimator 103 estimates statistics associated with the observation directions from the statistics of the initial images calculated with respect to the imaging directions (Step S204).

The simplest scheme of estimation is the linear interpolation. Generally, provided that there are actual measurement values $v(a)$ and $v(b)$ for values a and b, the value $v(x)$ for a value x between a and b is linearly interpolated by:

$v(x)=[v(a)\times(b-x)+v(b)\times(x-a)]/(b-a)$.

When the imaging directions are two directions of 0° and 90°, $v(x)=[v(0°)\times(90°-x)+v(90°)\times x)]/90°$.

Incidentally, when there is a captured image A captured in the imaging direction of 0° and a captured image B captured in the imaging direction of 90°, it is possible to assume an inverted image A' resulting from horizontally inverting the captured image A to be a captured image captured in the imaging direction of 180° and use the three images A, B, and A' as initial images. The inverted image A' depicts the object depicted in the captured image A in the inverted manner about the rotation axis orthogonal to the imaging direction. Here, the statistics for the observation directions from 90° to 180° can be interpolated from the statistics of the captured image B and inverted image A'.

Furthermore, the statistic $v(x)$ can be estimated for x over the entire circumference. In such a case, provided that the statistic changes smoothly and is continuous over the full circle (for example, $v(0°)=v(360°)$ for the n-order derived function of $v(x)$ is continuous and $v(x)$ is greater than or equal to zero), the Lagrange's interpolation, spline interpolation, least square interpolation, or the like can be used. Interpolation over the full circle is preferable in the case of using four initial images of an object captured from the front, back, right, and left or three initial images of an object captured at intervals of 120 degrees.

In addition to the above captured images $A(0°)$ and $B(90°)$ and inverted image $A'(180°)$, it is possible to assume an inverted image B' resulting from horizontally inverting the captured image B to be a captured image captured in the imaging direction of 270°, and use these four images as initial images of the object captured from the front, back, right, and left. In such a case, it is desirable to interpolate over the full circle.

When the imaging directions are three-dimensionally set, a parametric surface presenting the statistics in the directions by the distance from the center of the three-dimensional space is assumed and the above-described various kinds of interpolation can be applied to the parametric surface.

When a histogram is used as the statistic, the number of pixels in each bin (each pixel value) of the histogram for an observation direction can be obtained by interpolation.

Incidentally, the rendering by the render 105 (Step S205) and the estimation by the estimator 103 (Step S204) are independent from each other and therefore can be performed in the reversed order or in parallel. Furthermore, the calculation by the calculator 102 (Step S203) and the construction by the initializer 104 (Step S202) are independent from each other and therefore can be performed in the reversed order or in parallel.

Then, the corrector 106 corrects the images rendered with respect to the observation directions based on the statistics estimated in association with the observation directions (Step S206).

When the brightness, luminance, chrominance, hue, and/or contrast are/is used as the statistic, the rendered images are corrected by the single gamma correction or RGB color-by-color gamma correction so that the statistics of the images match the statistics estimated by interpolation. When the sharpness is used as the statistic, the rendered images can be corrected by adjusting the parameters of a blurring filter or sharpening filter to apply to the rendered images as appropriate so that the statistics of the images match the statistics estimated by interpolation.

Figure 8:
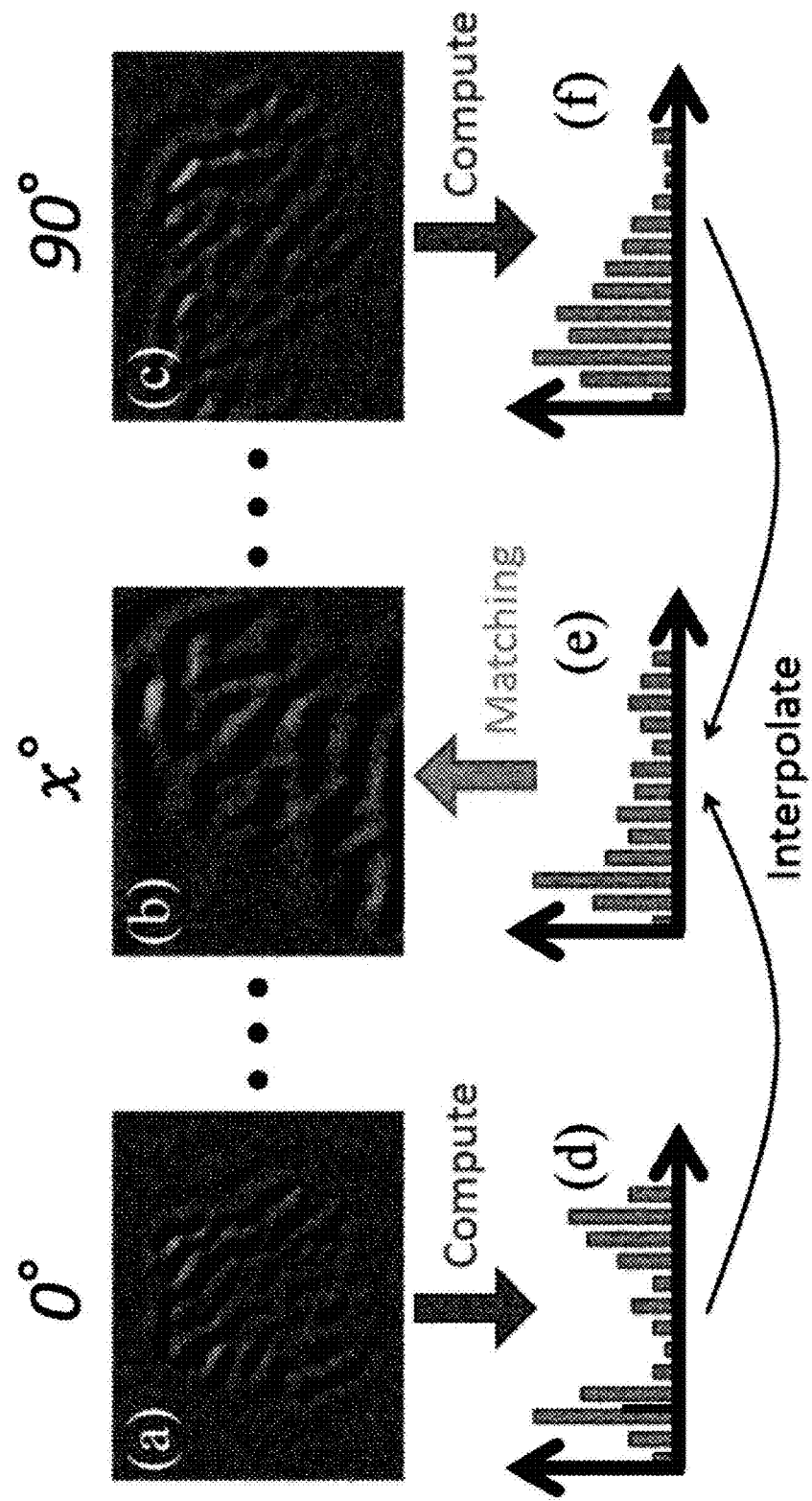
FIG. 8 is an explanatory figure presenting a scheme of estimating the statistics in observation directions.

The density histograms of the images themselves or the density histograms of pyramid images of a steerable pyramid are used as the statistic, histogram matching is performed so that the distribution of pixel values of the pixels contained in the image match the numbers of pixels estimated for the bins of the histogram. FIG. 8 is an explanatory figure presenting a scheme of estimating the statistic in an observation direction.

The Non Patent Literature 3 discloses a technique of obtaining an image C from two images A and B by making the image B similar in texture to the image A. The pyramid image histogram matching disclosed in this literature obtains the density histograms of pyramid images of the images A and B and replaces the density histograms of the pyramid images of the image B with the density histograms of the pyramid images of the image A with respect to each corresponding scale and passband.

In the example shown in this figure, the density histograms of pyramid images in each scale and passband ((a) and (c) in this figure) of the initial images of the specified imaging directions (0° and 90°) are calculated ((d) and (f) in this figure). Then, the density histogram in each observation direction (x°) ((e) in this figure) is estimated by interpolation using the above-described various interpolation techniques. Then, the density histogram of the pyramid image obtained from the image rendered with respect to each observation direction ((b) in this figure) is replaced with the density histogram estimated by interpolation to correct the pyramid image ((b) in this figure) by histogram matching. Subsequently, the corrected pyramid image ((b) in this figure) is used to compose an image, whereby a corrected image is obtained.

The scheme using the density histogram of the image itself corresponds to the scheme using the steerable pyramid method in which one scale and one passband are used in decomposition (substantially no decomposition).

Figure 9:
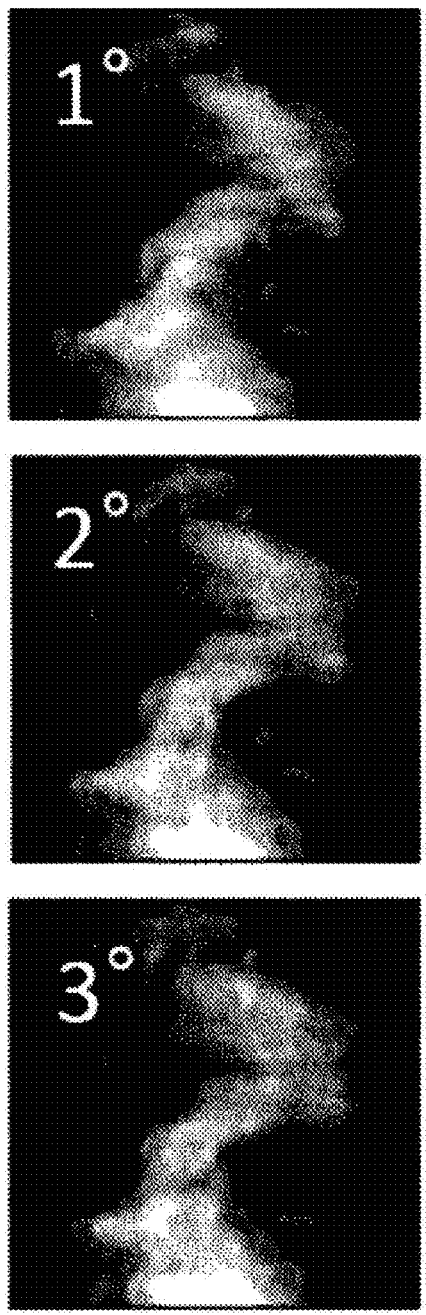
FIG. 9 is an explanatory figure presenting exemplary images obtained by correcting the rendered images based on the statistics estimated for the observation directions.

FIG. 9 is an explanatory figure presenting exemplary images obtained by correcting the rendered images based on the statistics estimated for the observation directions. This figure shows the results of correcting the images rendered with respect to the observation directions by steerable pyramid and histogram matching.

It can be seen from this figure that the problem of blurred images is reduced and the images are similar in texture to the initial images and look much more natural in comparison with FIG. 6.

After correcting the images rendered from the volume with respect to the observation directions based on the estimated statistics, the constructor 107 constructs a volume of the object from the initial images and their imaging directions and the corrected images and their observation directions (Step S207).

In this embodiment, a tomographic reconstruction technique is used to construct a volume. In other words, the tomography aims to construct an original three-dimensional figure of the object from the captured images of the object. This embodiment is characterized by applying the tomography to the corrected images to construct a volume giving the observer impression that it looks proper and natural, not necessarily constructing the original figure.

In the case described hereafter, three initial images are used: an image A captured in an imaging direction of 0° and an image B captured in an imaging direction of 90°, and additionally an inverted image A' of the image A that is assumed to be an image captured in an imaging direction of 180°.

Any tomography technique is applicable as in Step S202 to construct a volume from the initial images for the imaging directions of 0°, 90°, and 180°, and the corrected images for the observation directions of 1°, 2°, ..., 89°, 91°, 92°, ..., 179°.

The above case corresponds to the situation in which there are 181 images captured about a single rotation axis at one-degree intervals. Thus, a volume can be constructed at a high speed by applying the filtered backprojection method based on the Radon transform, which is extensively used in medical CT scan and other applications. In other words, the pixel positions are rotated in consideration of the angles of the imaging directions and observation directions of the images and the pixel values are convolved by the inverse Fourier transform.

Figure 10:
FIG. 10 is an explanatory figure presenting an exemplary image presenting the appearance of a volume constructed from the corrected images and seen in an observation direction.

FIG. 10 is an explanatory figure presenting an exemplary image presenting the appearance of a volume constructed from the corrected images and seen in an observation direction. This figure shows the rendered appearance of a volume seen in the same observation direction as in FIG. 5, namely from 45 degrees diagonally above. It can be seen from this figure that a clear, grid-free volume is obtained.

Incidentally, the method of least squares is applicable to the construction by the constructor 107. In other words, a new volume can be constructed as constructing a volume from initial images by:

$$V=(B^T B)^{-1} B^T P$$

in which the matrix P is created by arranging the pixel values of captured images for the imaging directions and corrected images for the observation directions, and the matrix B is a matrix for ray-casting in the imaging directions and observation directions.

The captured images are images actually captured and the corrected images are utterly estimated images. Thus, it is possible to make adjustment in favor of information on the captured images over information on the corrected images. In such a case, the elements regarding the captured images in the matrices P and B can be multiplied by a constant weight greater than 1 and then the steepest descent method or conjugate gradient method is applicable.

As described above, according to this embodiment, a volume more natural than the initial volume can be obtained simply by correcting the images rendered for the observation directions from the initial volume constructed from initial images based on the statistics estimated for the observation directions from the statistics of the initial images and reconstructing a volume from the initial images and corrected images. Then, the image processing device 101 can output the obtained volume as a volume of the object constructed from the initial images.

However, the volume can be made much more natural by repeating the process in which the render 105 renders images for the observation directions from a newly constructed volume, the corrector 106 corrects the images, and the constructor 107 further constructs a volume from the initial images and corrected images until the newly constructed volume satisfies a convergence condition. This repetition is controlled by the controller 108.

In other words, the image processing device 101 determines whether the volume constructed in the Step S207 satisfies a convergence condition (Step S208). If the convergence condition is not satisfied (Step S208; No), the image processing device 101 returns to the Step S205 and repeats the process in which images for the observation directions are rendered from the volume constructed last (Step S205), the rendered images are corrected based on the statistics (Step S206), and a volume is constructed from the corrected images (Step S207).

If the convergence condition is satisfied (Step S208; Yes), the volume or an image presenting the appearance of the volume seen in a desired direction is output as the processing result (Step S209), and this procedure ends.

The simplest convergence condition is "normally satisfied." In such a case, the process in which images for the observation directions are rendered from the volume constructed from the initial images (Step S205), the rendered images are corrected based on the statistics (step S206), and a volume is constructed from the corrected images (Step S207) is executed only one time.

Alternatively, it is possible to assume that the convergence condition is satisfied when the difference between the volume constructed the previous time and the volume constructed last is within a given error range. The difference between the volumes can be expressed by the value obtained by dividing the sum or square sum of the differences between voxel values (the distance in a color space) by the sum or square sum of all voxel values. If the value is lower than a given sufficiently low constant (for example, a given value between $10^{-3}$ and $10^{-5}$), the convergence is assumed.

Furthermore, it is possible to present the constructed volume to the user and assume that the convergence condition is satisfied when the user determines that a desired quality is achieved and enters a command indicating so.

Additionally, the convergence can easily be determined by rendering and comparing an image of the volume constructed the previous time and an image of the volume constructed last when seen in a specific direction.

This embodiment makes it possible to construct a natural volume of an object from initial images of the object captured in a small number of imaging directions.

As described above, this embodiment is applicable not only to a transparent or translucent object but also to an opaque object. The volume obtained in such a case has non-zero voxel values on the surface and its vicinity and zero or significantly low voxel values inside thereof.

Incidentally, it is possible to use two captured images A and B captured in orthogonal imaging directions (0° and 90°) as initial images in the construction by the initializer 104, and in the process by the render 105, corrector 106, and constructor 107, add an image A' resulting from horizontally inverting the captured image A as an initial image captured in the direction of 180° and even add an image B' resulting from horizontally inverting the captured image B as an initial image captured in the direction of 270°. Furthermore, it is possible to use the images A(0°), B(90°), and A'(180°) in odd-numbered repetition rounds and use the images A(0°), B(90°), and B'(270°) in even-numbered repetition rounds. In other words, it is possible to add or omit initial images in each processing as appropriate.

Embodiment 2

In the above embodiment, 89 observation directions of 1°, 2°, . . . , and 89° are prepared for two imaging directions 0° and 90° or 178 observation directions of 91°, 92°, . . . , and 179° are prepared for three imaging directions 0°, 90°, and 180°, and images are rendered with respect to the observation directions based on the volume obtained the previous time during the repeated calculation. However, the number and orientation of observation directions can be changed as appropriate.

An exemplary scheme uses one observation direction (45°) between two imaging directions (0° and 90°) in the first repetition round, uses three observation directions (22.5°, 45°, and 67.5°) between the imaging directions and existing observation direction in the next repetition round, . . . , and uses $2^n-1$ observation directions in the n-th repetition round so as to distribute the observation directions between the imaging directions at equal intervals.

Furthermore, the observation directions can include the same directions as the imaging directions. According to the above example, this scheme renders images for the directions of 0°, 90°, and 180° from the constructed volume, corrects the rendered images based on the statistics estimated for the observation directions of 0°, 90°, and 180° (which are equal to the statistics calculated from the initial images), and constructs a volume again from the images corrected with respect to the observation directions of 0°, 1°, 2°, . . . , 89°, 90°, 91°, 92°, . . . , 179°, and 180°.

The above scheme corrects the images rendered from an existing volume and then constructs a volume again using only the corrected images. Thus, the volume is less dependent on the direction and then gives the user impression that the volume changes much more smoothly between when seen in the imaging directions and when seen in directions other than the imaging directions.

Additionally, it is possible to use a given number of observation directions every time but change their orientation randomly or use the directions resulting from division under a given rule. For example, it is possible to use the direction dividing two imaging directions at the golden ratio as the first observation direction, and repeat the process of designating the direction dividing the maximum angle between the already referred imaging direction and the observation direction at the golden ratio as the next observation direction, whereby the orientation of only one observation direction can be changed upon repetition. Furthermore, it is possible to gradually increase the number of observation directions and change their orientation randomly.

This embodiment constructs a volume with a small number of observation directions and increases the number of observation directions or shifts the observation directions as the calculation progresses, whereby a volume as natural as possible can be constructed while reducing the amount of calculation.

Embodiment 3

In repeated calculation in the field of image processing, the image quality is often improved as the resolution is sequentially increased from low to high. Also in this embodiment, it is possible to gradually increase the resolution of the images and volume to process in the repeated processing as the repetition progresses.

Figure 11:
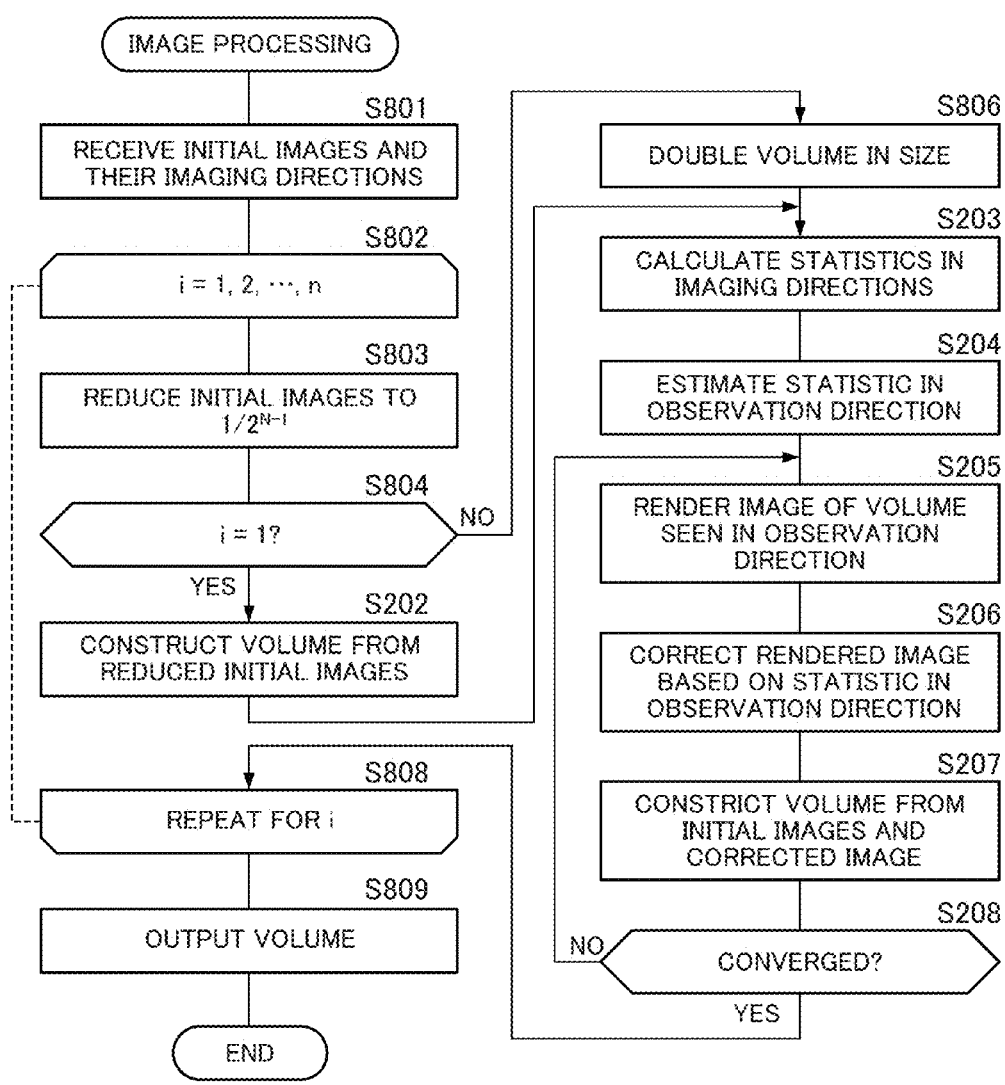
FIG. 11 is a flowchart showing the flow of control on the progression of calculation with multilevel resolution executed by the image processing device.

For example, the simplest case of application of N-level multi-resolution will be described hereafter. FIG. 11 is a flowchart showing the flow of control on the progression of calculation with multilevel resolution executed by the image processing device.

As the image processing device 101 is supplied with initial images (Step S801), the following processing is repeated for an integer i=1, 2, . . . , N (Step S802).

First, the initial images are reduced to $(1/2^{N-1})$ in the numbers of pixels in width and height to obtain reduced images (Step S803).

Then, the obtained reduced images are assumed to be captured images captured in multiple imaging directions and if it is the first repetition round (i=1) (Step S804; Yes), the processing of the Steps S202 (the construction by the initializer) and S203 to S208 is executed.

If it is the second or higher repetition round (Step S804; No), in place of the Step S202 (the construction by the initiator), the volume obtained in the previous repetition round (i−1) is doubled in the numbers of voxels in width, height, and depth and employed as the initial volume (Step S806), and then the processing of the Steps S203 to S208 is executed.

After the repetition is over (S808), the volume obtained last is output (Step S809), and this procedure ends.

In this procedure, for correcting the images rendered from the volume in the repetition rounds, it is possible to change the numbers of scales and passbands to decompose the images into pyramid images in accordance with the resolution of the images in process. This is because a small number of scales and passbands still yield sufficient results for low resolution images.

In the repetition round i=1, 2, . . . , N−1, for example, the convergence condition can be alleviated by, for example, fixing the number of repetition rounds to a small number. This is because approximation sufficiently works for constructing a volume from reduced images.

In this embodiment, a high quality volume can be constructed by multi-resolution image processing.

Embodiment 4

In the above-described embodiments, the initial images are multiple images captured in multiple imaging directions. It is possible to assume one image acquired by the acquirer 111 of the image processing device 101 to be those captured in multiple imaging directions and treat them as multiple initial images to execute the subsequent processing.

For example, when there is an existing video image A of a flame captured from the front, the video image A is supplied to the image processing device 101 as video images captured from the front and a side.

Alternatively, it is possible to prepare a video image A' resulting from horizontally inverting the video image A and supplies to the image processing device 101 the video image A as a video image captured from the front and the video image A' as a video image captured from a side. Then, a nearly symmetric volume can be obtained.

Figure 12:
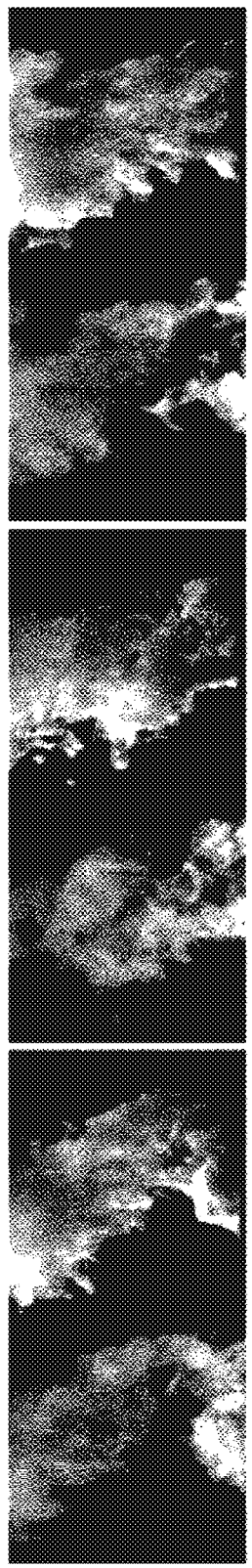
FIG. 12 is an explanatory figure showing three cases in which one input image is assumed to be images captured in multiple imaging directions and processed by the image processing device.

FIG. 12 is an explanatory figure showing three cases in which one input image is assumed to be images captured in multiple imaging directions and processed by the image processing device. This figure shows three cases. In each case, an initial image given as those in two imaging directions is shown on the left and an image of a volume constructed by the image processing device 101 and seen in a direction different from the imaging directions is shown on the right.

As seen from this figure, this scheme can construct from a video image of a real object captured in one direction a volume that is different from the real object but proper.

Additionally, in the above-described embodiments, all initial images acquired by the acquirer 111 are referred to in order to construct an initial volume, the statistics of all initial images are calculated, all calculated statistics are referred to in order to estimate the statistics for the observation directions, and all initial images are referred to in order for the constructor 107 to construct a volume.

However, it is not necessary to use all acquired initial images, namely it is possible to use some of them, as one or more initial images for calculating the statistics ("the first material images," hereafter), multiple initial images used for constructing an initial volume ("the second material images," hereafter), and one or more initial images used along with the corrected images for constructing a volume ("the third material image," hereafter). For example, the images captured in imaging directions of 0°, 30°, 60°, and 90° are used as the first material images, the images captured in imaging directions of 0° and 90° are used as the second material images, and the images captured in imaging directions of 15°, 45°, and 75° are used as the third material images.

The first, second, and third material images can be the same, overlap in part with each other, or share no image in the same direction with each other. Furthermore, the first, second, and third material images can be changed in each repetition round by selecting from among the initial images as appropriate. Incidentally, in the above-described embodiments, all acquired initial images are used as the first, second, and third material images.

Additionally, when there are multiple observation directions, particularly when there are a sufficiently large number of observation directions, it is possible that the constructor 107 constructs a volume with reference only to the corrected images and observation directions without use of the third material images. For example, the initial images in the imaging directions of 0° and 90° are used as the first and second material images and the constructor 107 constructs a volume with reference not to the initial images but to the corrected images in the observation directions of 1°, 2°, . . . , 89°, 91°, 92°, . . . , 179°.

When one image is used as the first material image, the statistic calculated on the first material image is used as the statistic estimated for an observation direction no matter what the observation direction is. In this mode, a volume having a texture that scarcely changes in any observation direction and giving the observer impression that the volume is uniform can be obtained.

Furthermore, images supplied as initial images are sufficient as long as an object is depicted therein and do not need to be those of an object captured with a camera. For example, when an image of an imaginary thing drawn by an artist is an initial image, a three-dimensional volume of the imaginary thing can be obtained by the image processing device 101. For example, when the acquirer 111 is supplied with a single image depicting an imaginary thing, the imaging directions of 0° and 90° are associated with the image and the directions of 180° and 270° are associated with the inverted images of the image, whereby four initial images can be created.

In other words, the imaging direction in the present disclosure does not always need to be the direction in which an image of an object is captured. For example, when an image of an imaginary thing drawn by an artist is used as an initial image, the direction in which the artist presumed he observed the thing in his imaginary world and drew the thing (the drawing direction) is the imaging direction of the initial image.

Furthermore, images supplied as initial images do not always need to be images of the same object captured in different imaging directions. For example, an image depicting a tree in fall colors is used as an initial image in the direction of 0°, an inverted image of this image is used as an initial image in the direction of 180°, an image depicting a flame is used as an initial image in the direction of 90°, and an inverted image of this image is used as an initial image in the direction of 270°. Then, a three-dimensional volume of a fictitious object that looks like a tree in one direction, gradually changes the form as the observation direction is shifted, and then looks like a flame in another direction can be obtained.

As described above, this scheme can eliminate tasks such as calibration of multiple camera positions, and synchronization in timing and adjustment in size of multiple video images. Thus, this scheme makes it possible to prepare, for example, a large number of volume materials used in computer games using three-dimensional graphics in a short time with low workload and low cost.

As described above, the image processing device according to the present disclosure comprises:

a calculator calculating a statistic of each of first material images among multiple initial images depicting an object;

an initializer constructing a volume of the object from multiple second material images and multiple second imaging directions associated respectively with the multiple second material images among the multiple initial images;

an estimator estimating the statistic associated with an observation direction from the calculated statistics;

a render rendering an image by observing the constructed volume in the observation direction;

a corrector correcting the rendered image based on the statistic estimated in association with the observation direction; and a constructor constructing a volume of the object from at least the observation direction and corrected image.

Furthermore, the image processing device of the present disclosure can further comprise:

a controller repeating supplying the render with the volume constructed by the constructor, rendering by the render, correction by the corrector, and construction by the constructor until the volume constructed by the constructor satisfies a convergence condition.

Furthermore, the image processing device of the present disclosure can be configured as follows:

the controller changes the orientation or number of observation directions in each round of the repetition, instructs the estimator to estimate the statistic associated with the changed observation direction, and supplies the constructed volume to the render.

Furthermore, the image processing device of the present disclosure can be configured as follows:

the observation direction is different from the first imaging directions associated with the first material images, and the constructor constructs a volume of the object from the observation direction and corrected image and one or more third material images and one or more third imaging directions associated respectively with the one or more third material images among the multiple initial images.

Furthermore, the image processing device of the present disclosure can be configured as follows:

the constructor constructs the volume by minimizing the difference between the one or more third material images and the images to be rendered by observing the volume to construct in the one or more third imaging directions, and the difference between the corrected image and the image to be rendered by observing the volume to construct in the observation direction.

Furthermore, the image processing device of the present disclosure can be configured as follows:

in the minimization of the constructor, the difference regarding the multiple imaging directions is weighted more than the difference regarding the observation direction.

Furthermore, the image processing device of the present disclosure can be configured as follows:

the first imaging directions and observation direction are orthogonal to a single rotation axis, and the estimator estimates the statistic associated with the observation direction by interpolating the statistics associated with the first imaging directions in accordance with the angle between the first imaging directions and observation direction.

Furthermore, the image processing device of the present disclosure can be configured as follows:

the statistic is a histogram of pixel values.

Furthermore, the image processing device of the present disclosure can be configured as follows:

the statistic is histograms of pixel values of pyramid images decomposed by the steerable pyramid method.

Furthermore, the image processing device of the present disclosure can further comprises:

an acquirer acquiring one image depicting the object and associating multiple imaging directions different from each other with the one acquired image to obtain the multiple initial images.

Furthermore, the image processing device of the present disclosure can be configured as follows:

the resolution of images and volumes to process in the repetition rounds is gradually increased as the repetition progresses.

The image processing method of the present disclosure comprises:

a calculation step of calculating a statistic of each of first material images among multiple initial images depicting an object;

an initialization step of constructing a volume of the object from multiple second material images and multiple second imaging directions associated respectively with the multiple second material images among the multiple initial images;

an estimation step of estimating the statistic associated with an observation direction from the calculated statistics;

a rendering step of rendering an image by observing the constructed volume in the observation direction;

a correction step of correcting the rendered image based on the statistic estimated in association with the observation direction; and a construction step of constructing a volume of the object from at least the observation direction and corrected image.

The program of the present disclosure allows a computer to function as:

a calculator calculating a statistic of each of first material images among multiple initial images depicting an object;

an initializer constructing a volume of the object from multiple second material images and multiple second imaging directions associated respectively with the multiple second material images among the multiple initial images;

an estimator estimating the statistic associated with an observation direction from the calculated statistics;

a render rendering an image by observing the constructed volume in the observation direction;

a corrector correcting the rendered image based on the statistic estimated in association with the observation direction; and a constructor constructing a volume of the object from at least the observation direction and corrected image.

The above program can be recorded on a computer-readable non-transitory information recording medium such as a compact disc, flexible disc, hard disc, magneto-optical disc, digital video disc, magnetic tape, ROM (read only memory), EEPROM (electrically erasable programmable ROM), flash memory, and semiconductor memory. The information recording medium can be distributed/sold independently from the computer.

Generally, a computer reads a program recorded on a non-transitory information recording medium onto a RAM (random access memory) that is a temporary storage, and the CPU (central processing unit) executes the commands contained in the read program. However, with an architecture enabling mapping of a ROM and RAM in a single memory space for execution, the CPU directly reads and executes the commands contained in a program stored on the ROM. Furthermore, the above program can be distributed/sold from a server device or the like to a terminal device or the like via a transitory transfer medium such as a computer communication network independently from a computer on which the program is executed.

INDUSTRIAL APPLICABILITY

The present disclosure can provide an image processing device and image processing method suitable for constructing a natural volume based on an object even if there are a small number of images depicting the object, and non-transitory recording medium storing a program for realizing the image processing device and image processing method using a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

11 Object
12 Camera
13 Imaging direction
101 Image processing device
102 Calculator
103 Estimator
104 Initializer
105 Render
106 Corrector
107 Constructor
111 Acquirer

What is claimed is:

1. An image processing device comprising:
at least one memory operable to store program code;
at least one processor operable to read the program code and operate as instructed by the program code, the program code including:
calculator code configured to cause at least one of said at least one processor to calculate a statistic of each of first material images among multiple initial images depicting an object;
initializer code configured to cause at least one of said at least one processor to construct a volume of the object from multiple second material images and multiple second imaging directions associated respectively with the multiple second material images among the multiple initial images;
estimator code configured to cause at least one of said at least one processor to estimate a statistic associated with an observation direction from the calculated statistics;
render code configured to cause at least one of said at least one processor to render an image by observing the constructed volume in the observation direction;
corrector code configured to cause at least one of said at least one processor to correct the rendered image based on the statistic estimated in association with the observation direction; and
constructor code configured to cause at least one of said at least one processor to construct a volume of the object from at least the observation direction and corrected image.

2. The image processing device according to claim 1, further comprising:
controller code configured to cause at least one of said at least one processor to repeat supplying the render with the volume constructed by the constructor code, rendering by the render code, correction by the corrector code, and construction by the constructor code until the volume constructed by the constructor code satisfies a convergence condition.

3. The image processing device according to claim 2, wherein
the controller code is further configured to cause at least one of said at least one processor to change the orientation or number of observation directions in each round of the repetition, instructs the estimator code configured to cause at least one of said at least one processor to estimate the statistic associated with the changed observation direction, and supplies the constructed volume to the render code.

4. The image processing device according to claim 2, wherein
the resolution of images and volumes to process in the repetition is gradually increased as the repetition progresses by the controller code.

5. The image processing device according to claim 1, wherein
the observation direction is different from first imaging directions associated with the first material images, and
the constructor code is further configured to cause at least one of said at least one processor to construct a volume of the object from the observation direction and corrected image and one or more third material images and one or more third imaging directions associated respectively with the one or more third material images among the multiple initial images.

6. The image processing device according to claim 5, wherein
the constructor code is further configured to cause at least one of said at least one processor to construct the volume by minimizing the difference between the one or more third material images and the images to be rendered by observing the volume to construct in the one or more third imaging directions, and the difference between the corrected image and the image to be rendered by observing the volume to construct in the observation direction.

7. The image processing device according to claim 6, wherein in the minimization of the constructor code, the difference regarding the multiple imaging directions is weighted more than the difference regarding the observation direction.

8. The image processing device according to claim 5, wherein the first imaging directions and observation direction are orthogonal to a single rotation axis, and the estimator code is further configured to cause at least one of said at least one processor to estimate a statistic associated with the observation direction by interpolating the calculated statistics associated with the first imaging directions in accordance with the angle between the first imaging directions and observation direction.

9. The image processing device according to claim 1, wherein the calculated statistic is a histogram of pixel values.

10. The image processing device according to claim 1, wherein the calculated statistic is histograms of pixel values of pyramid images decomposed by a steerable pyramid method.

11. The image processing device according to any one of claim 1, further comprising:

acquirer code configured to cause at least one of said at least one processor to acquire one image depicting the object and associating multiple imaging directions different from each other with the one acquired image to obtain the multiple initial images.

12. An image processing method, comprising:

calculating a statistic of each of first material images among multiple initial images depicting an object;

constructing a volume of the object from multiple second material images and multiple second imaging directions associated respectively with the multiple second material images among the multiple initial images;

estimating a statistic associated with an observation direction from the calculated statistics;

rendering an image by observing the constructed volume in the observation direction;

correcting the rendered image based on the statistic estimated in association with the observation direction; and constructing a volume of the object from at least the observation direction and corrected image.

13. A non-transitory recording medium storing a program allowing a computer to function as:

calculating a statistic of each of first material images among multiple initial images depicting an object;

constructing a volume of the object from multiple second material images and multiple second imaging directions associated respectively with the multiple second material images among the multiple initial images;

estimating a statistic associated with an observation direction from the calculated statistics;

rendering an image by observing the constructed volume in the observation direction;

correcting the rendered image based on the statistic estimated in association with the observation direction; and constructing a volume of the object from at least the observation direction and corrected image.

* * * * *